United States Patent [19]
Sawatari et al.

[11] Patent Number: 5,982,288
[45] Date of Patent: Nov. 9, 1999

[54] VISIBILITY SENSOR SYSTEM

[75] Inventors: Takeo Sawatari, Bloomfield Hills; Philip A. Gaubis, Walled Lake; Clark J. Charnetski, Ann Arbor, all of Mich.

[73] Assignee: Sentec Corporation, Walled Lake, Mich.

[21] Appl. No.: 09/053,034

[22] Filed: Apr. 1, 1998

Related U.S. Application Data

[63] Continuation-in-part of application No. 08/819,887, Mar. 18, 1997.

[51] Int. Cl.$^6$ ...................................................... G01W 1/00
[52] U.S. Cl. ........................... 340/601; 340/602; 340/905; 315/82; 250/338.1
[58] Field of Search ................................ 340/601, 602, 340/604, 903, 905, 425.5; 318/483, DIG. 2, 444; 250/338.1, 338.5, 339.1; 315/82, 156

[56] References Cited

U.S. PATENT DOCUMENTS

| | | | |
|---|---|---|---|
| 4,520,360 | 5/1985 | Schwab | 340/947 |
| 4,690,508 | 9/1987 | Jacob | 350/331 R |
| 4,737,629 | 4/1988 | Iwama et al. | 340/601 |
| 4,807,096 | 2/1989 | Skogler et al. | 362/142 |
| 4,871,917 | 10/1989 | O'Farrell et al. | 250/341 |
| 4,874,242 | 10/1989 | Bezard et al. | 340/905 |
| 4,882,565 | 11/1989 | Gallmeyer | 340/461 |
| 4,931,767 | 6/1990 | Albrecht et al. | 340/602 |
| 5,347,387 | 9/1994 | Rice | 359/152 |
| 5,349,267 | 9/1994 | Brassier et al. | 315/82 |
| 5,663,710 | 9/1997 | Fasig et al. | 340/601 |
| 5,673,039 | 9/1997 | Pietzsch et al. | 340/905 |
| 5,710,554 | 1/1998 | Pettler et al. | 340/905 |

OTHER PUBLICATIONS

Environmental Sensor Systems for Safe Traffic Operations Project No.: DTFH 61–92–C–00012; U.S. Dept. of Transp., Federal Highway Administration; Oct. 1994; pp. i–ii, 1–1, 2–1 through 2–12, 9–1, 9–2, References.

PCT International Search Report; Applicant: Sentec Corporation; International App. No. PCT/US98/05037.

*Primary Examiner*—Jeffery A. Hofsass
*Assistant Examiner*—Van T. Trieu
*Attorney, Agent, or Firm*—Dykema Gossett PLLC

[57] ABSTRACT

A visibility sensor system includes a housing having a sensor head opening. A removable sensor head assembly is removably coupled to the housing within the sensor head opening. The sensor head assembly has a sensor enclosure and a connector. An electronics module is coupled to the sensor head through the connector.

33 Claims, 6 Drawing Sheets

VISIBILITY SENSOR SYSTEM

RELATED APPLICATION

This application is a continuation-in-part of application Ser. No. 08/819,887 filed Mar. 18, 1997.

STATEMENT REGARDING FEDERALLY SPONSORED RESEARCH

This invention was made with government support under Contract DTRS-57-95-C-00080 awarded by the Federal Highway Administration, United States Department of Transportation. The Government has certain rights in this invention.

BACKGROUND OF THE INVENTION

The present invention relates generally to a sensor system to detect visibility and, more specifically, to a visibility sensor system having a removable sensor head that may be removed for servicing.

Reduced visibility on highways due to fog or blowing dust has often been the cause of tragic traffic accidents. Fog, especially in mountainous regions, has a tendency to build up in patchy dense pockets. At highway speeds, in particular, a driver may suddenly find himself within one of these patchy dense fog pockets.

The ability to adequately warn drivers of dense fog is highly desirable. If adequate warning is provided to drivers, drivers may then reduce their speed based on the density of the fog. Adequate warnings will reduce loss of life.

Several optical and non-optical methods for determining the presence of fog are known. Most, however, are not suitable for highway visibility sensors. There are several optical systems that may be used. Radar and lidar systems are used to gather general weather data. Such systems are too expensive, bulky, insensitive and difficult to use on a highway. Closed circuit television has limited use for visibility detection, but it cannot function at night and requires monitoring by an operator. Airports commonly use transmissometers. Transmissometers measure the transmission of a light beam traveling a given path. Transmissometers are very expensive and require considerable maintenance and thus are not suitable to detect patchy highway fog. Coulter counters are often used in clean room monitoring. Coulter counters are very expensive and have high maintenance and power consumption requirements.

Non-optical devices such as triboelectric current sensors depend on the flow of gas rubbing against an electrode. Fog, however, frequently occurs in quiet atmospheric conditions. Spark discharge sensors require sensor electrodes to continually be kept clean and thus maintenance costs are prohibitive. A dosimeter-type particle density measurement device does not provide real-time data.

Another optical device for measuring fog is a nephelometer. Known nephelometers have expensive optical systems and are very large in size. The optical system requires constant maintenance to clean the windows through which the optics are directed.

In certain situations, it may be desirable for the vehicle to have a visibility detection system associated therewith. It would likely be cost prohibitive to provide highway visibility detection systems across the country. Therefore, it is desirable to provide a visibility sensor system associated with the vehicle.

On ships, it is difficult to determine visibility due to lack of background for comparison. For ships, it may also be desirable to locate a visibility sensor on the ship.

It would therefore be desirable to provide a visibility sensor system that overcomes the drawbacks of the prior art. Particularly, it would be desirable to provide a visibility sensor system that is inexpensive, has low maintenance, and is reliable to endure the conditions experienced on a highway.

SUMMARY OF THE INVENTION

It is therefore an object of the invention to provide an improved visibility detection system. More specifically, it is an object of the invention to provide a visibility detection system suitable for incorporation on an automotive vehicle.

According to one embodiment of the invention, a detector includes a housing having a first hollow opening and a second hollow opening. A first light source is fixed within the housing and directs light through the first hollow opening to a sample volume outside the housing. A first light detector receives light reflected from the sample volume through the second hollow opening. A controller is coupled to the first light source and the first detector. The controller determines an output indicative of visibility from the light received by the first light detector.

In another embodiment of the visibility sensor system, a display may be coupled to the controller to warn drivers of the existence of fog ahead. The display may also indicate a safe driving speed through the fog.

In yet another embodiment of the invention, a means for compensating for the deterioration of the first detector may be included. To compensate for the deterioration of the first detector, a second light source may be placed adjacent to the first detector and illuminate the first detector with a predetermined amount of light. The controller then calculates the deterioration of the first detector in its visibility calculation. In another aspect of the invention, a means for determining deterioration of the first light source may be concluded. The means for compensating for deterioration of the first light source includes a second detector located adjacent to the first light source. The second detector would provide feedback to the controller as to the deterioration of the light source. The controller would then compensate for any deterioration of the first light source in its calculation for visibility.

In yet another embodiment of the invention, a method for detecting visibility comprises the steps of illuminating a sample volume of air from a first hollow opening within a housing using a first light source, detecting the amount of light scattering from the volume of air with a first detector that receives light through a second hollow opening and calculating a visibility factor based upon the light scattering from the fog particles in the volume of air.

In one aspect of the method for calculating visibility, the calculation may take into consideration deterioration of the first detector and the first light source.

In still another embodiment of the invention, a removable sensor head comprises a sensor enclosure defining a first optical port and a second optical port. A first circuit board is coupled to the sensor enclosure. A first connector is coupled to the first circuit board. A light source is coupled to the first circuit board, which positions the light source within the first optical port. A second circuit board is coupled to the sensor enclosure. A second connector coupled to the second circuit board. A light detector is coupled to the second circuit board. The second circuit board positions the light detector within the second optical port. A calibration memory is coupled to the second circuit board.

In a further embodiment of the invention, a visibility sensor assembly has a housing having a sensor head opening. A removable sensor head assembly is removably coupled to the housing within the sensor head opening. The sensor head assembly has a sensor enclosure and a connector. An electronics module is coupled to the sensor head through the connector.

One advantage to providing a removable sensor head is that the maintenance costs are reduced because the sensor head may be easily replaced.

One advantage of the present invention is that no optics or windows are required within the hollow openings through which light is transmitted and received. This eliminates a major problem for optical sensor systems. That is, eliminating the persistent need for cleaning of the optics or windows.

Another advantage of the present invention is that short periodic onsite inspections for calibration are not required. The sensor system provides a means for compensating for the deterioration of a detector and light source. The sensor system also can provide a self check and report the results to a central monitoring station.

Another advantage of the present invention is that a variety of communication options may be supported. For example, communication to a centrally located communication center may be provided via fiber optics, a cable, RF, telephone, and cellular phones.

Yet another advantage of the present invention is that the system operates using a significantly less amount of energy compared to that of other known fog detection systems. The sample rate for determining fog may be changed depending on whether the conditions around the sensor are changing to make fog more likely. If the conditions are such that fog is likely, the sample rate may be increased. Power use is thereby minimized.

Yet another advantage of the present invention is the compactness of the sensor system. A separate post does not need to be installed along the highway for a sensor system. The sensor system may be installed on currently existing posts such as speed limit signs or other highway signs. If used for a vehicle application, the package size and weight are small.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Figure 1:
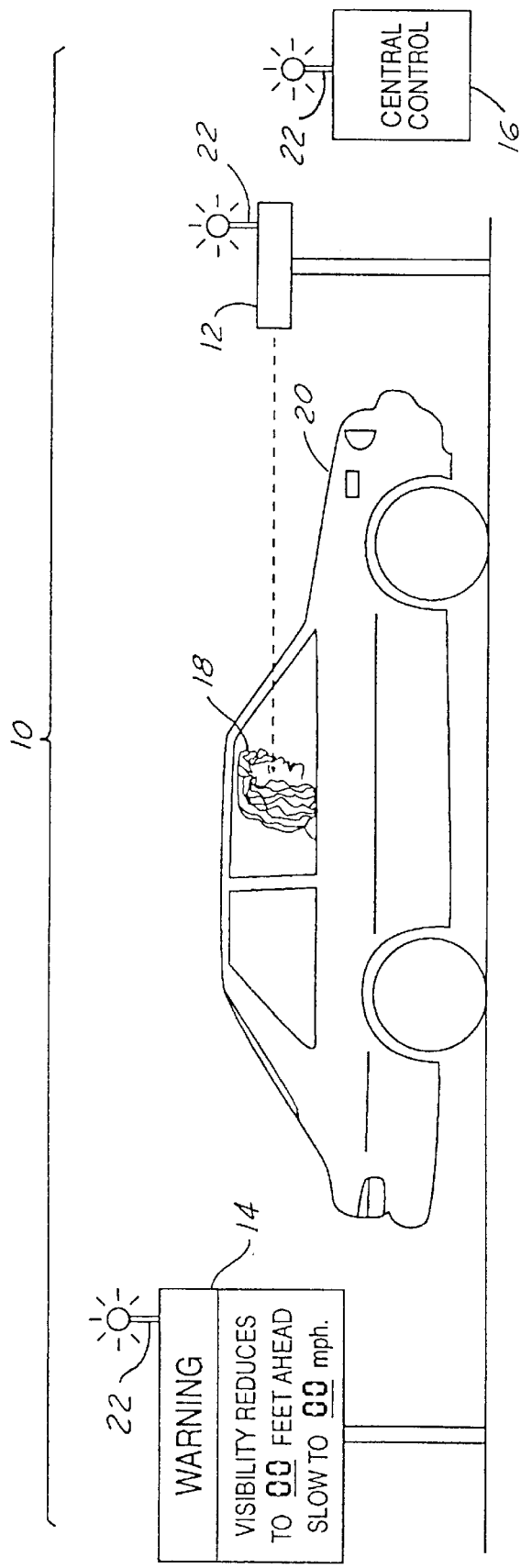
FIG. 1 is a diagrammatic view of a highway warning system employing a visibility sensor according to the present invention.

Referring now to the drawings, like reference numerals are used to identify identical components in the various views. Although the invention will be illustrated in terms of a fog detection visibility sensor, it will be appreciated that this invention may be used with other visibility applications such as detection of blowing dust. In addition the visibility sensor may be used for remote weather stations, airports and in maritime applications such as near a lighthouse.

Referring now to FIG. 1, a highway visibility detection system 10 has a visibility sensor unit 12, a warning display 14 and a central controller 16. Visibility sensor unit 12 is preferably placed at eye level of a vehicle operator 18 in an automotive vehicle 20. Visibility sensor unit 12, warning display 14 and central controller 16 may all be linked through a communications network. A communication network, for example, may be cellular phone, RF, cable, or optical fiber. As shown, each of visibility sensor unit 12, warning display 14 and central controller 16 has an antenna 22 which may be used for RF or cellular communication between each.

Upon detection of reduced visibility by visibility sensor unit 12, an indication as to the distance of visibility may be displayed on warning display 14. Also, a suggested vehicle speed may also be displayed on warning display 14.

Central controller 16 may be part of an intelligent transportation system (ITS). The central controller 16 may be a manned controller which may perform a number of functions such as initiating self-tests for the sensor unit 12 or sending a maintenance crew to service the sensor in the event of contamination.

Figure 2:
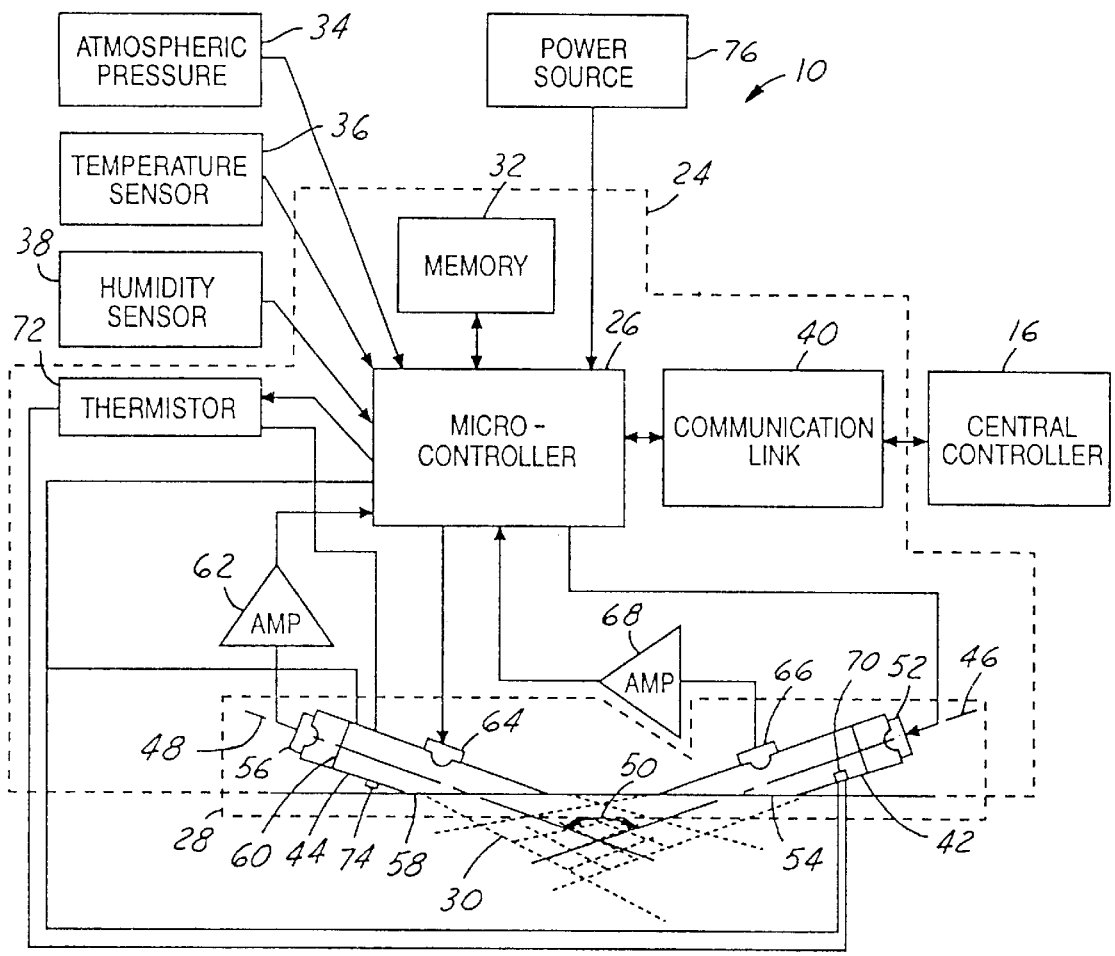
FIG. 2 is a diagrammatic of a visibility sensor head according to the present invention.

Referring now to FIG. 2, visibility sensor unit 12 preferably has most of its components sealed within a housing 24. Several visibility sensor units may be coupled within one housing 24. The operation of the system is generally controlled by a micro controller 26. A sensor head 28 is coupled to and controlled by micro controller 26. Sensor head 28 transmits light to a sample volume 30 and provides micro controller 26 an indication of the amount of light reflected from fog particles in a sample volume 30 below sensor head 28. A memory 32 is used to store various information and is coupled to micro controller 26. Memory 32 is preferably nonvolatile memory. Memory 32, for example, may contain a conversion factor for converting the amount of light received by sensor head 28 to a visibility distance. Memory 32 may also store service and calibration data, security codes, the serial number of the system, and visibility data history.

Various sensors for sensing the atmospheric conditions around the housing 24 of visibility sensor system 12 are coupled to micro controller 26. Such sensors may include an atmosphere pressure sensor 34, a temperature sensor 36 and a humidity sensor 38.

Micro controller 26 may also be coupled to a communications link 40 that allows micro controller 26 to communicate with a central controller 16. Although atmospheric pressure sensor 34 has been shown coupled directly to micro controller 26, atmospheric pressure sensor 34 may be coupled directly to central controller 16. In such a case, atmospheric pressure data would be provided through communications link 40 to micro controller 26. Micro controller 26 may be used to calculate the safe speed based upon the visibility detected by the sensor head 28. The calculation of a safe speed may be done at a central controller.

Communications link 40 may be one of a number of types of communications links that may be used to link micro controller 26 to central controller 16. Because the detector system may be used in a variety of locations and conditions, flexibility for various types of communications is required. Communications link 40 may, for example, be cellular telephone link, an RF link, a fixed cable link, or optical fiber link. Communications link 40 may be used to couple to a warning display (shown as 14 of FIG. 1) on the highway.

Sensor head 28 has a first optical port 42 and a second optical port 44. First optical port 42 has a first optical axis 46 and second optical port 44 has a second optical axis 48. First optical axis 46 coincides with the longitudinal axis of first optical port 42. Likewise, the second optical axis 48 coincides with the longitudinal axis of second optical port 44. An angle 50 between first optical axis 46 and second optical axis 48 may be about 150°.

In some applications the first optical port could coincide with the second optical port. In such a case, no the ports would share the same longitudinal axis.

Recessed within first optical port 42 is a first light source 52. First light source 52 is preferably mounted in an end of first optical port 42. First light source 52 is preferably an infrared light emitting diode having a relatively narrow beam width. First light source 52 may, for example, have a total beam width of 10°. Light from first light source 52 emerges from first optical port 42 at a first hollow opening 54. The cone of diverging light from first light source 52 illuminates a sample volume 30 outside first optical port 42.

Second optical port 44 has a first detector 56 located in an end thereof. First detector 56 is sensitive to the wave length of light scattered from the sample volume 30. First detector 56 may have a small surface area such as a five square millimeter surface area. Light is reflected from particles in sample volume 30 into a second hollow opening 58. A light filter 60 may be interposed in the optical path between sample volume 30 and first detector 56. Filter 60 is provided to filter ambient light from first detector 56. First detector 56 provides an output to micro controller 26 through a low noise amplifier 62 corresponding to the amount of light reflected from particles in sample volume 30.

In one constructed embodiment, both second optical port 44 and first optical port 42 were constructed of 0.5 inch diameter by 3.5 inch tube.

A test light source 64 may be provided in second optical port 44. Test light source 64 is also preferably an infrared LED. Test light source 64 preferably has a relatively wide beam width of approximately 80° so that light may be directed into second optical port 44 to first detector 56. Test light source 64 is coupled to micro controller 26. Micro controller 26 controls the operation of test light source 64. Test light source 64 is used during self testing and self calibration as will be further described below.

A compensation detector 66 is coupled within first optical port 42. Compensation detector 66 may have a smaller area such as a 1.5 square millimeter detection area. Compensation detector 66 is coupled to micro controller 26 through a low noise amplifier 68, compensation detector 66 provides feedback to micro controller 26 as to the operation of first light source 52 during self test and self calibration.

A heater 70 is coupled adjacent to first light source 52 and first detector 56 to prevent condensation on the optical surfaces. Heater 70 may be a tungsten wire or thermoplastic element. Heater 70 may, for example, maintain a differential temperature of roughly 5° C. between the optical surfaces and ambient temperature to prevent condensation. A thermistor 72 may be coupled adjacent to the heater 70 to provide feedback to micro controller 26 so that the functioning of heater 70 may be monitored.

An insect repellant 74 may be placed inside or adjacent to first optical port 42 and second optical port 44. Insect repellant 74 may be a variety of insect repellant means. Insect repellant may, for example, be a chemical known to be poisonous or repellant to the insects of the area into which the highway visibility detector system will be placed.

A power source 76 is used to power the highway visibility detection system 10. Highway visibility detection system 10 is flexible in the sense that it may operate from a variety of sources of power. Power source 76 may, for example, be a solar cell coupled to storage batteries. The power source may also be batteries or be coupled directly to a fixed power line.

Figure 3:
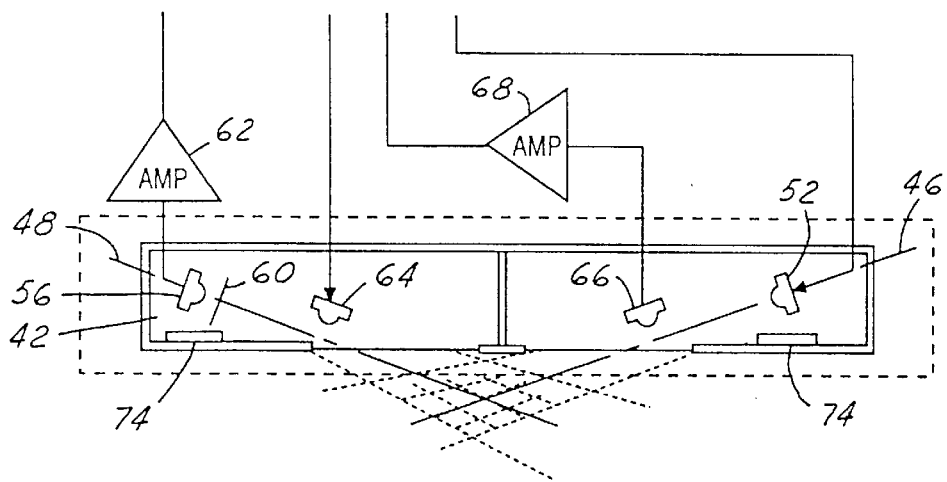
FIG. 3 is a diagrammatic view of an alternative embodiment of a visibility sensor.

Referring now to FIG. 3, an alternative embodiment for first optical port 42 and second optical port 44 is shown. In this embodiment, first optical axis 46 and second optical axis 48 are not aligned with the longitudinal axis of first optical port 42 and second optical port 44. First optical axis 46 and second optical axis 48 also preferably have an angle of about 150° between them. The embodiment of FIG. 3 operates in the same manner as that of FIG. 2.

One method for operating a highway visibility detector system of the present invention would be to continuously operate the system so as to constantly provide feedback to the central control and to a warning display or several displays. Operating a fog detection system continuously, however, is unnecessary and consumes power unnecessarily.

Figure 4:
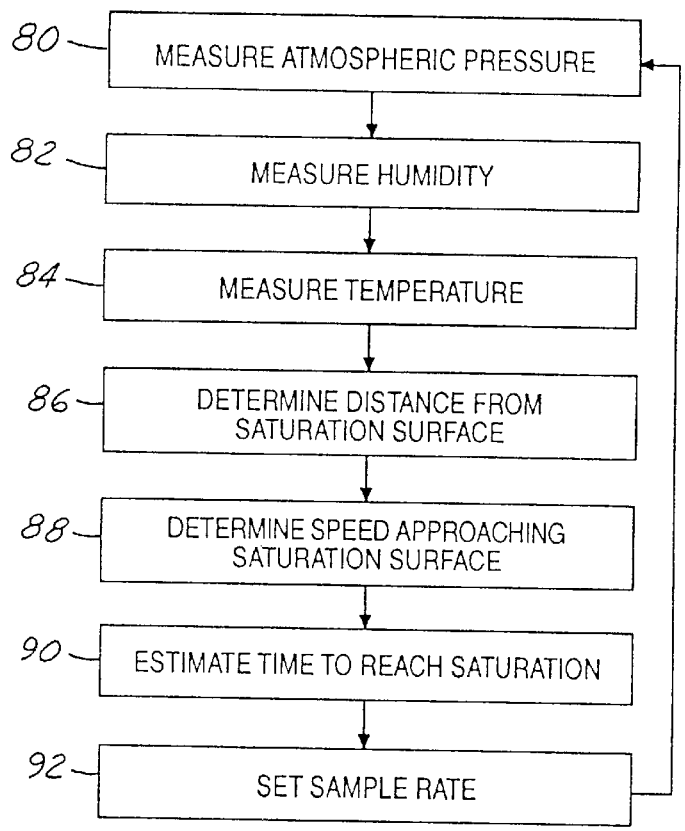
FIG. 4 is a flow chart a method for operating a visibility sensor system to conserve energy.

Referring now to FIG. 4, based upon atmospheric conditions, the potential for fog can be predicted. From meteorology, a saturation surface, which is sometimes called the maximum vapor pressure surface, can be defined in three-dimensional space defined by temperature, humidity and pressure or two dimensional surface defined by temperature and humidity. Fog occurs when the saturation surface is reached. In order to conserve energy, micro controller 26 performs the following operations. First the atmospheric pressure is measured in step 80. In step 82 the humidity is measured. In step 84 the temperature is measured. Each of the atmospheric pressure, humidity and temperature conditions are preferably measured outside the housing of the highway visibility detector system. From the condition measured in steps 80 through 84, step 86 determines the distance from the saturation surface. In step 88, the distance from the saturation surface is compared with the previous distance from the saturation surface to determine the speed that the saturation surface is being approached. In step 90, the time to reach the saturation surface is estimated. In step 92, the sample rate is changed so that the micro controller will turn on to determine visibility at a higher rate if the saturation surface is being approached. One method for setting the sample rate may be that if the estimated time to reach saturation is below 3 hours, then the micro controller will turn on at a rate twice as fast as the normal operation mode. For example, this faster rate may be twice an hour. As the estimated time goes lower, the sample rate can be further increased. By increasing the time of sample only when the saturation surface is being approached, energy is conserved. After executing step 92, step 80 is re-executed and the next sample period determined by the micro controller.

In this manner, the highway visibility detector system 10 does not operate needlessly. Thus, energy is conserved.

In operation, during visibility sampling, the first light source illuminates a sample volume 30 beneath housing 24. Fog or dust particles cause light to be scattered from the sample volume 30 into first detector 56. The amount of light scattered will be dependent upon the particle size and/or the number of particles of the contaminants within the sample volume 30. The light scattered from the sample volume has a direct correlation to the visibility present around the highway visibility detector. Date acquisition may be taken once or preferably sampled a number of times to statistically ensure satisfactory results. The received voltage level corresponding to the amount of illumination on the first detector 56 may be converted by a micro controller 26 into a visibility. Micro controller 26 may also convert the visibility into a safe speed for the roadway. The safe speed may be calculated or looked up in a table stored in memory 32.

The sensor system also has the ability to self calibrate. During manufacturing, a light scattering calibration object may be positioned in the sample volume. The micro controller, when commanded, can save the measurement and determine a correction factor to be stored in the non-volatile memory. The connection factor will be used to correct subsequent visibility measurements. Calibration may easily be done at the manufacturer and easily confirmed when installed in the field.

Figure 5:
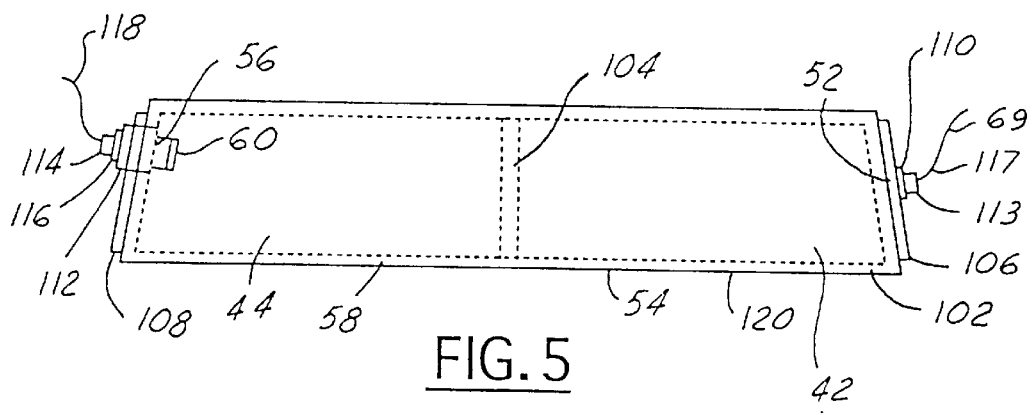
FIG. 5 is a partial cutaway elevational view of a removable sensor head according to the invention.
Figure 6:
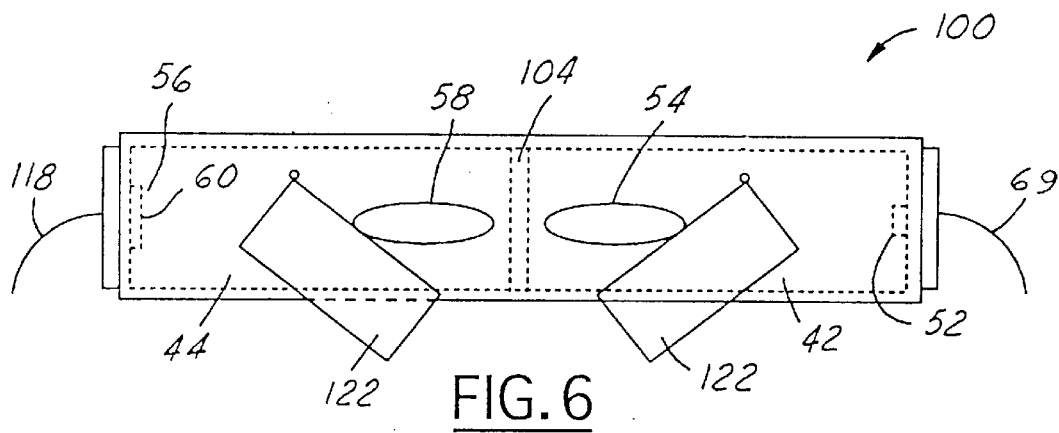
FIG. 6 is a bottom view of the removable sensor head of FIG. 5.

Referring now to FIGS. 5 and 6, in certain implementations of the invention it may be desirable to have a sensor head 100 that is easily removable and replaceable. In such a manner, servicing time of the visibility sensor would be reduced. A sensor enclosure 102 defines first optical port 42 and second optical port 44. A center wall 104 separates first optical port 42 from second optical port 44. End pieces 106 and 108 of each port 42 and 44 opposite center wall 104 have end pieces 106 and 108 respectively. Each end piece 106 and 108 are respectively used to secure circuit boards 110 and 112 thereto. Sensor enclosure 102 of removable sensor head 100 has a bottom surface 120 that has first hollow opening 54 and second hollow opening 58 similar to that described above.

Circuit board 110 is also used to secure light source 52. Circuit board 110 may also be used to secure a connector 113 which is used to supply power to light source 52. Connector 113 may be one of a variety of types of connectors including being a male or female end of a snap in or screw type connector. Connector 113 should allow easy connection and disconnection to facilitate removal of removable sensor head 100. A plurality of wires 117 may be used to couple light source 52 to a power source or microcontroller.

Circuit board 112 is secured to photo detector 56. Photo detector 56 is preferably coupled to infrared filter 60 as described above. Circuit board 112 preferably has an amplifier 62 mounted thereto. By mounting amplifier 62 to circuit board 112, noise transmission through connecting wire 118 is reduced. Circuit board 112 also preferably has a calibration memory 116 coupled thereto. Functionally, calibration memory 116 may be part of memory 32 shown in FIG. 2. By locating calibration memory 116 on circuit board 112, the calibrations associated with the removable sensor head 100 are also removed. When a replacement sensor head 100 is coupled to the visibility sensor system, micro controller 26 uses the information stored in calibration memory 116 to generate the required results.

Commercially, photo detectors are often packaged together with an amplifier 62. A wire or a plurality of wires 118 are used to couple connector 114 to the remaining circuitry of the visibility sensor.

Referring now to FIG. 6, first hollow opening 54 and second hollow opening 58 within bottom surface 120 are preferably oval in shape. The oval shape has been found to be beneficial in providing a high signal to noise ratio for the fog detection system, as well as providing the least signal deterioration due to contamination of the surface of first light source 52.

A shutter 122 shown on second hollow opening 58 may be used to cover second hollow opening 58 to prevent contamination of photo detector 56. Of course, a second shutter may also be incorporated in a similar manner over first hollow opening 54 to prevent contamination of light source 52. Shutter 122 is preferably a simple solenoid operated device. Shutter 122 may be switch operated, operated manually or automatically operated. One manner for automatically operating shutter 122 is to estimate the likelihood of fog with respect to the approachment of a saturation surface as described above. As the saturation surface is approached, shutter 122 may be opened. To prevent shutter 122 from opening in a car wash, the system may be coupled to a sensor in the transmission of the vehicle that senses whether the vehicle is in neutral, park or the engine is stopped. Commonly vehicles are placed in neutral when being washed in a car wash. This prevents soap film from fouling the sensors.

Figure 7:
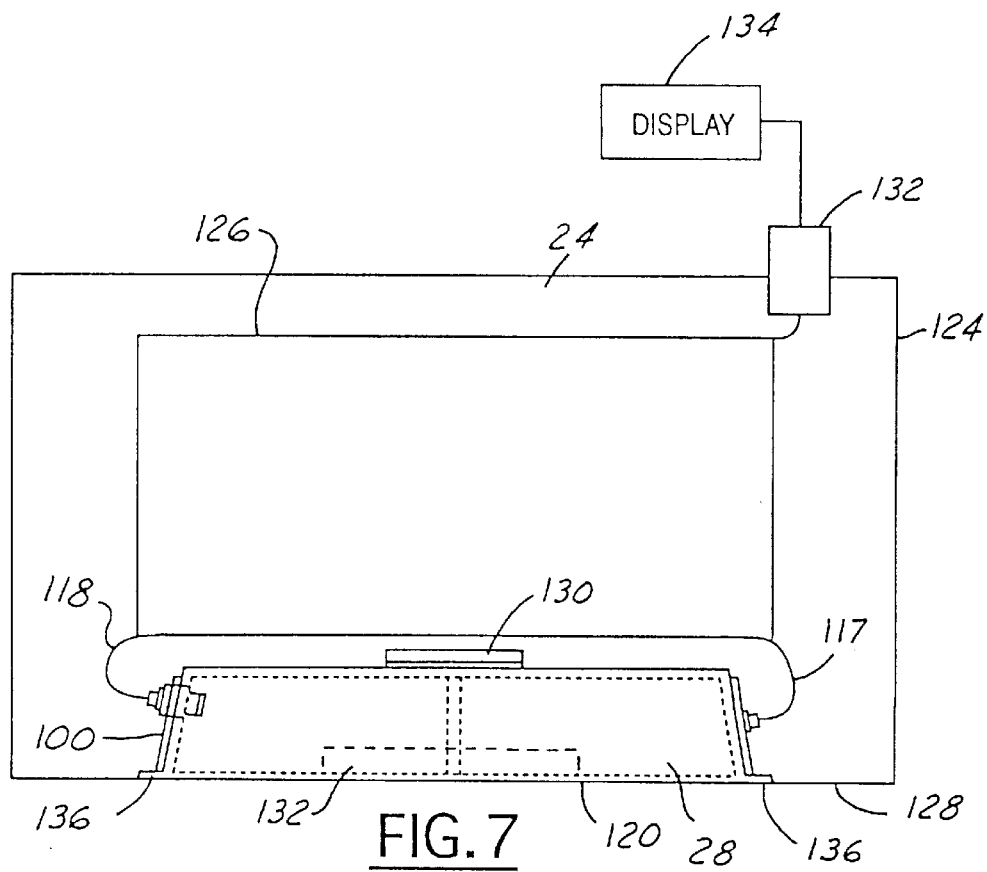
FIG. 7 is a side elevational view of a removable sensor and electronic module mounted within a housing.
Figure 8:
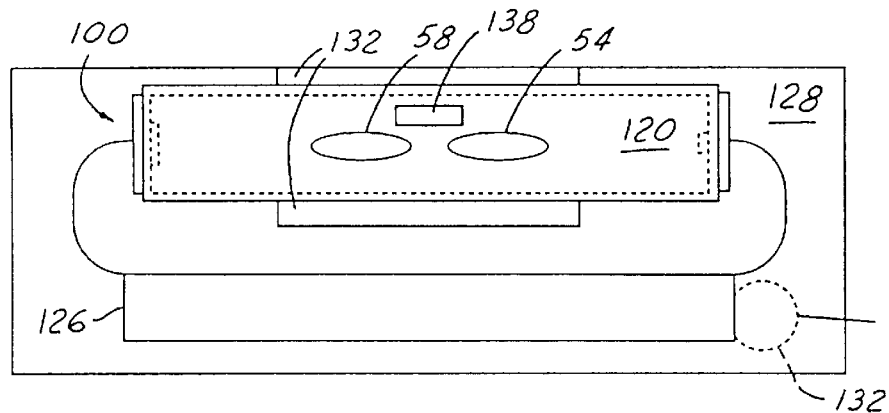
FIG. 8 is a bottom view of the visibility sensor system of FIG. 7.

Referring now to FIGS. 7 and 8, a housing 124 is shown having a removable sensor head 100 and an electronic module 126. Electronic module 126 may have different variations. Preferably, electronic module 126 contains many of the features of FIG. 2 such as a micro controller 26, a memory 32 and a communications link 40. Also in some applications electronic module contains algorithms to determine the true fog occurrence from such data provided by an atmospheric pressure sensor 34, a temperature sensor 36, a humidity sensor 38. The sensors may be coupled to each fog sensor. To reduce cost and avoid redundancy, however, one or all sensors may be located in a central location if a group of visibility sensors are used in a single system, for example, along a highway.

Bottom surface 120 of removable sensor head 100 is preferably flush with bottom surface 128 of housing 124. For applications, where the visibility sensor will be mounted to a moving vehicle, providing bottom surface 120 of sensor head 100 flush with bottom surface 128 of housing 124 does not disturb the laminar flow near openings 54 and 58.

Removable sensor head 100 may be snap fit within housing 124. A mechanical fastening device 130 may also be used to secure removable sensor head 100 within housing 124. Mechanical fastening device 130 may, for example, be used in conjunction with screws or other fasteners to secure sensor head 100 within housing 124. The particular mechanical fastening device 130 is preferably relatively easy to disassembly and reassembly to facilitate replacement of sensor head 100.

Electronic module 126 may also be designed to be easily removed from within housing 124. In the practical sense, sensor head 100 is more likely to be replaced or serviced.

Electronic module 126 may be coupled to an external power supply through a connector 132. Connector 132 may also be used to couple electronic module 126 to a remote display 134. Display 134 may also be coupled through a central computer or host controller. Remote display 134 may be a warning signal or an audible signal. Remote display 134 may provide an indication as to the distance of visibility. Display may be a visual indicator, an audible indicator or a combination of the two. If the fog sensor is coupled to a vehicle, the visual indicator may be incorporated into an instrument panel or a heads-up display. The audible indicator may be a buzzer or be coupled to he audio system of the vehicle.

A gasket 136 may be used between removable sensor head 100 and housing 124 to prevent infiltration of moisture into housing 124. Likewise, connector 132 may be a sealed connector to prevent water from entering housing 124.

Referring now to FIG. 8, a heater 138 may be coupled adjacent to first hollow opening 58 and second hollow opening 54. By placing heater 138 near openings 54 and 58, frost is prevented from building up around either opening. If frost forms on the edge of either opening, the accuracy of the detector system may be affected.

In operation, removable sensor head 100 has thus been made easy to remove and replace from housing 124. To replace removable sensor head 100, mechanical fastening device 130 releases removable sensor head 100. Connectors 113 and 114 are disconnected.

To connect a replacement sensor head, connectors 113 and 114 are connected to removable sensor head 100. Mechanical fastening device 130 is coupled to the replacement sensor head 100. The calibration data from calibration memory 116 is then communicated to micro controller 26. The calibration data was stored within calibration memory 116 during manufacture of the sensor head.

Figure 9:
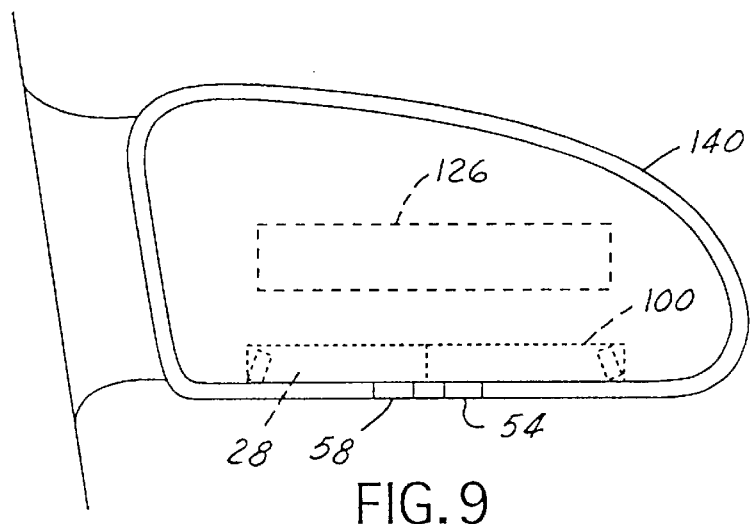
FIG. 9 is a forward looking elevational view of an external rear view mirror housing of a car having a visibility detection system located therein.
Figure 10:
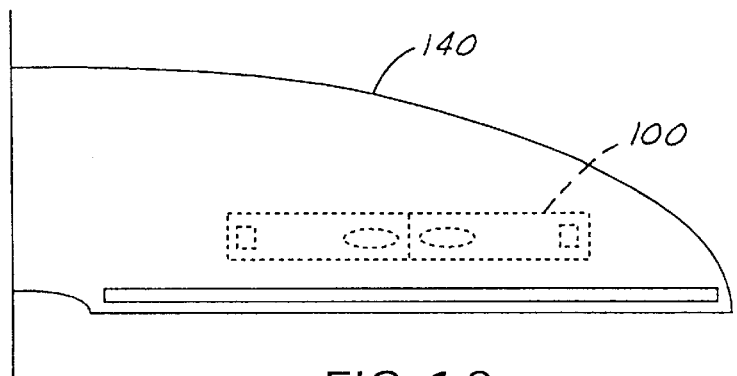
FIG. 10 is a top elevational view of the rear view mirror housing with visibility detection system of FIG. 9.

Referring now to FIGS. 9 and 10, the removable sensor head configuration is particularly suitable for implementation within an automotive vehicle. This feature may be included as an after-market application or as original equipment. One manner for implementing a removable sensor head 100 into an automobile is to place removable sensor head 100 into a rear view mirror housing 140. Removable sensor head 100 is preferably placed behind mirror 142 and directed in a downward position. Bottom surface 120 of sensor head 110 is preferably flush with bottom 144 of rear view mirror housing 140. In this manner, the laminar flow of air around mirror housing 140 is least disturbed.

Electronic module 126 may also be incorporated within rear view mirror housing 140. However, electronic module 126 may easily be incorporated into the interior of the automotive vehicle. By placing electronic module 126 within the interior of the automotive vehicle, the electronics are not subjected to the harsh weather conditions and thus may increase the accuracy and life of electronic module 126.

It is desirable to include shutters 122 in an automotive application. It is desirable to close shutters 122 during a car wash to prevent soap residue from building on the light detector or light source. By providing shutters 122, the life of sensor head 100 may be increased. Shutters 122 may also be applied to a highway sign application.

Figure 11:
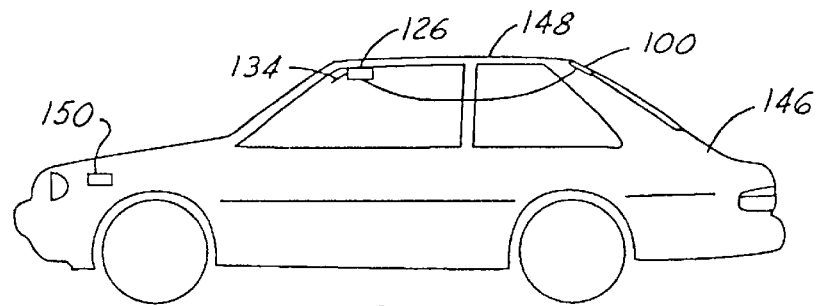
FIG. 11 is a side view of an automotive vehicle having a visibility detection system mounted thereto.

Referring now to FIG. 11, an automotive vehicle 146 has a roof 148. A removable sensor head 100 is shown coupled near the rear end of roof 148. Sensor head 100 may be positioned to reduce wind resistance. Electronic module 126 may be placed in many areas of vehicle including within the interior of the vehicle adjacent to display unit 134 with appropriate wiring. Display unit 134 and electronic module 126 may, for example, be mounted to a rear view mirror within the vehicle.

Electronic module 126 may also be coupled to vehicle battery 150 which provides power for the entire detector system 10.

Sensor head 10 may be removable or fixed when included in an automotive vehicle. Sensor head 10 may, for example, be placed in the trim around the rear window of the vehicle. In such a manner, sensor head 100 becomes unobtrusive.

Figure 12:
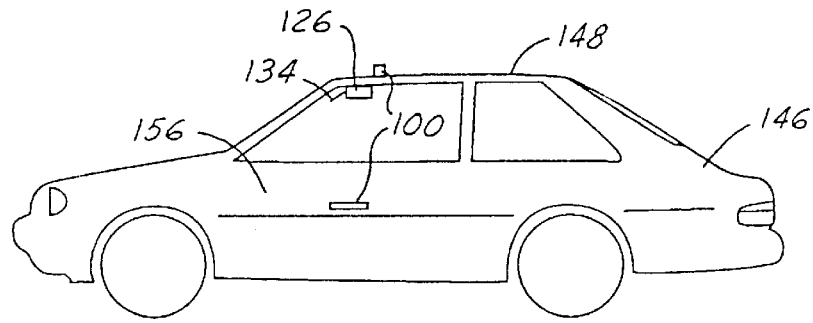
FIG. 12 is a side view of an automotive vehicle having a visibility detection system mounted in an alternative manner to that of FIG. 11.
Figure 13:
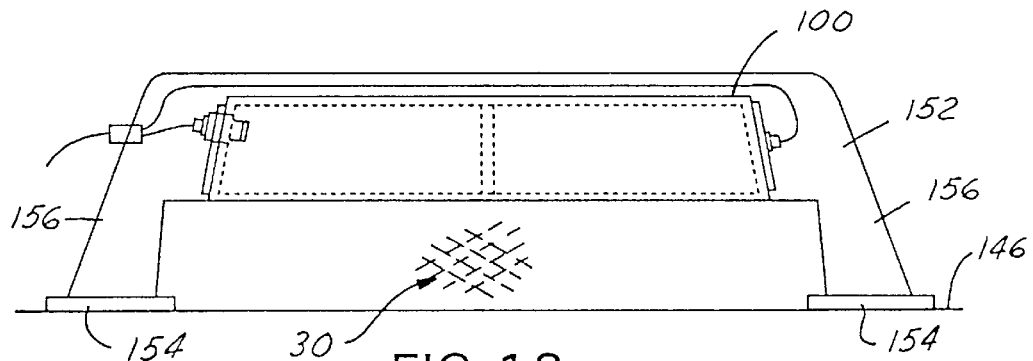
FIG. 13 is a cross-sectional view of an alternative sensor head housing.
Figure 14:
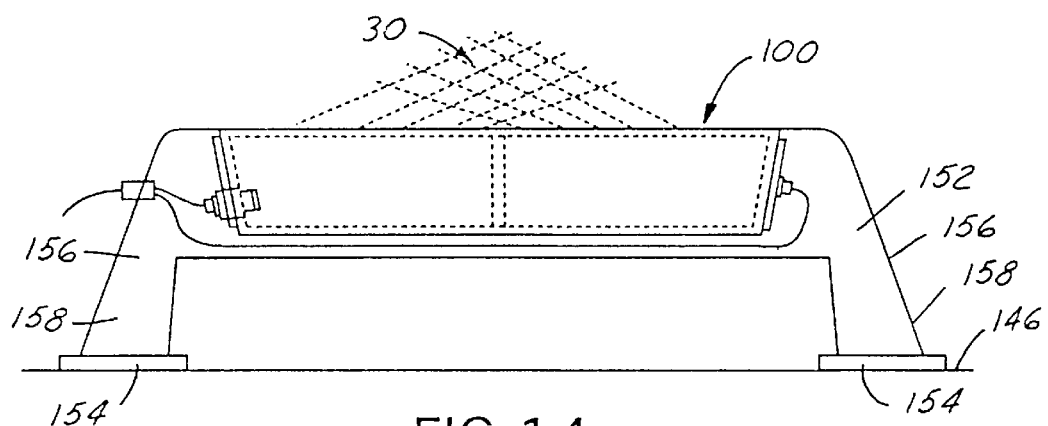
FIG. 14 is a side cross-sectional view similar to that of FIG. 13 having sensor located in a different orientation.

Referring now to FIGS. 12, 13 and 14, removable sensor head 100 may be detachable from automotive vehicle 146. By providing a detachable housing 152, visibility detector system 10 is particularly suited for after-market automotive applications. Detachable housing 152 preferably has magnets 150 suitable for coupling detachable housing 152 to a steel component such as roof 148 or a vehicle door 155.

Removable sensor head 100 may be removed from and coupled to detachable housing 152 as described above. As is best shown in FIGS. 13 and 14, the housing 152 may have legs 156. Legs 156 have magnets 150 therein for attachment to the automotive vehicle.

As shown in FIG. 13, sample volume 30 may be between detachable housing 152 and the exterior automotive vehicle 146.

As shown in FIG. 14, sample volume 30 may be directed away from automotive vehicle 146.

For an after-market application, an automotive vehicle owner merely couples the detachable housing 152 to the outside of automotive vehicle 146. Display device 134 and electronic module 126 may, for example, be clipped to a rear view mirror within the passenger compartment of automotive vehicle 146. Electronic module 126 may, for example, be powered through the cigar lighter of the automotive vehicle which is coupled to vehicle battery 150. One cable having a plurality of wires may be used to couple detachable housing 152 and removable sensor head 100 therein to electronic module 126.

In operation, a sensor head for an automotive vehicle may be used to activate the fog lights that are commonly found on the front of vehicles (and the rear of vehicles in Europe). Such a system may work as follows: once the saturation detects that fog is likely, the shutters 122 are opened; if fog is detected, the fog lights of the vehicle may then be illuminated.

While the best mode for carrying out the present invention has been described in detail, those familiar with the art to which this invention relates will recognize various alternative designs and embodiments for practicing the invention as defined by the following claim. For example, the humidity, temperature and atmospheric pressure sensors may be replaced by a wind velocity sensors if this invention were to be used to measure visibility in blowing dust.

What is claimed is:

1. A visibility sensor assembly comprising:
   a housing having a sensor head opening;
   a removable sensor head assembly removably coupled to said housing within said sensor head opening, said sensor head assembly having a sensor enclosure and a connector wherein said sensor enclosure defines a first optical port and a second optical port each having a respective first hollow opening and a second hollow opening; and
   an electronics module coupled to said sensor head through said connector.

2. A visibility sensor assembly as recited in claim 1, wherein said electronics module is coupled within said housing.

3. A visibility sensor assembly as recited in claim 1, wherein said removable sensor head assembly further comprises:
- a first circuit board coupled to said sensor enclosure;
- a first connector coupled to said first circuit board;
- a light source coupled to said first circuit board, said first circuit board positioning said light source within said first optical port;
- a second circuit board coupled to said sensor enclosure;
- a second connector coupled to said second circuit board; and
- a light detector coupled to said second circuit board, said second circuit board positioning said light detector within said second optical port.

4. A visibility sensor assembly as recited in claim 1, further comprising a first shutter for selectively closing said first hollow opening.

5. A visibility sensor assembly as recited in claim 1, further comprising a second shutter for selectively closing said second hollow opening.

6. A visibility sensor assembly as recited in claim 1, further comprising a heater positioned adjacent to said first hollow opening.

7. A visibility sensor assembly as recited in claim 1, wherein said housing includes a housing bottom surface and said sensor head assembly includes a sensor bottom surface flush with said housing bottom surface.

8. A visibility sensor assembly as recited in claim 1, further comprising a gasket sealing said sensor head opening.

9. A visibility sensor assembly as recited in claim 1, further comprising a magnet coupled within said housing.

10. A visibility sensor assembly as recited in claim 1, wherein said housing is an exterior mirror housing.

11. A visibility sensor assembly as recited in claim 1, further comprising a mechanical fastening device coupling said sensor head assembly to said housing.

12. A visibility sensor for an automotive vehicle comprising:
- a housing having a sensor head opening;
- a sensor head assembly including a mechanical fastening device configured to removably couple said assembly to said housing within said sensor head opening, said sensor head assembly further including a sensor enclosure having a first opening through which a light source in accordance with an input signal illuminates a sample volume outside said housing and a second opening through which a light detector detects light and generates an output signal indicative of the amount of light scattered from particles in the sample volume, said input signal and said output signal terminating in one or more connectors associated with said sensor head assembly;
- means for selectively covering at least one of said first opening and said second opening;
- an electronics module coupled to said sensor head assembly through said connector; and
- a display electrically coupled to said sensor head assembly, said display coupled within the automotive vehicle.

13. A visibility sensor as recited in claim 12, wherein said electronics module is coupled within said housing.

14. A visibility sensor as recited in claim 12, wherein said electronics module is coupled within said automotive vehicle.

15. A visibility sensor as recited in claim 12 wherein said covering means includes a first shutter for selectively closing said first opening.

16. A visibility sensor as recited in claim 15 wherein said covering means further includes a second shutter for selectively closing said second opening.

17. A visibility sensor as recited in claim 12 further comprising a heater positioned adjacent to said first opening.

18. A visibility sensor as recited in claim 12, wherein said housing comprises an exterior rearview mirror housing.

19. A visibility sensor as recited in claim 12, further comprising one or more magnets coupled within said housing.

20. A visibility sensor as recited in claim 19, wherein said housing has a pair of legs, said magnets coupled to said legs.

21. A visibility sensor as recited in claim 12 wherein said covering means is responsive to a closure signal.

22. A visibility sensor as recited in claim 21 further including means for generating said closure signal as a function of at least temperature and humidity so as to open said covering means as the likelihood of fog increases.

23. A visibility sensor as recited in claim 22 wherein said closure signal generating means is further responsive to pressure.

24. A visibility sensor as recited in claim 21 further including means for generating said closure signal when a closure condition exists, said closure condition being one selected from the group consisting of a transmission of said automotive vehicle being in a neutral condition, the transmission being in a park condition, and an engine of said vehicle being in a stopped condition.

25. A visibility sensor as recited in claim 12 wherein said electronics module includes means for generating said input signal as a function of temperature and humidity so that said sample volume is illuminated at a rate corresponding to the likelihood of fog.

26. A visibility sensor as recited in claim 25 wherein said input signal generating means is further responsive to atmospheric pressure.

27. A sensor head assembly for a visibility sensor unit including a housing, said sensor head assembly comprising:
- a sensor enclosure having a plurality of walls defining a first optical port and a second optical port, said first optical port having a first opening associated therewith and said second optical port having a second opening associated therewith;
- a light source responsive to an input signal and disposed in said first optical port, said light source being configured to emit a light beam along a first optical axis through said first opening to illuminate a sample volume located outside of said head assembly;
- means for selectively covering at least one of said first opening and said second opening;
- a light detector disposed in said second optical port and configured to detect light through said second opening along a second optical axis and generate an output signal in response thereto indicative of the amount of light scattered from particles in the sample volume;
- wherein said light source and said light detector are located at respective ends of said first and second optical ports distal from said first and second openings thereof to thereby minimize contamination of said light source and said light detector due to entry of contaminants through said first and second openings.

28. A sensor head assembly as recited in claim 27 wherein said covering means comprises a first shutter configured to selectively cover said first opening and a second shutter configured to selectively cover said second opening.

29. A sensor head assembly as recited in claim 28 wherein said first and second shutters are responsive to a closure signal generated as a function of at least temperature and humidity so as to open said first and second shutters at a rate increasing as the likelihood of fog increases.

30. A sensor head assembly as recited in claim 27 wherein said input signal and said output signal terminate in one or more connectors, said sensor head assembly further including a mechanical fastening device configured to removably secure said sensor head assembly to said housing.

31. A sensor head assembly as recited in claim 27 wherein said first and second optical ports comprise respective tubes.

32. A sensor head assembly as recited in claim 27 wherein said first optical axis and said second optical axis form an oblique angle therebetween.

33. A sensor head assembly as recited in claim 32 wherein said angle is about 150 degrees.

* * * * *